United States Patent
Gao

(10) Patent No.: US 10,315,598 B2
(45) Date of Patent: Jun. 11, 2019

(54) SAFE PROTECTION EQUIPMENT FOR ALL VEHICLES AND DRIVERS FROM BOTH FRONT AND REAR

(71) Applicant: Qiusheng Gao, San Jose, CA (US)

(72) Inventor: Qiusheng Gao, Wujiang (CN)

(*) Notice: Subject to any disclaimer, the term of this patent is extended or adjusted under 35 U.S.C. 154(b) by 0 days.

(21) Appl. No.: 15/453,799

(22) Filed: Mar. 8, 2017

(65) Prior Publication Data
US 2018/0251090 A1 Sep. 6, 2018

Related U.S. Application Data

(63) Continuation-in-part of application No. 15/451,357, filed on Mar. 6, 2017.

(51) Int. Cl.
| | |
|---|---|
| *B60R 19/26* | (2006.01) |
| *B60R 19/28* | (2006.01) |
| *B60R 19/32* | (2006.01) |
| *B60R 19/36* | (2006.01) |
| *B60T 7/22* | (2006.01) |
| *B60R 19/30* | (2006.01) |
| *B60R 19/20* | (2006.01) |
| *B62D 21/15* | (2006.01) |
| *B60R 19/00* | (2006.01) |
| *B60R 21/00* | (2006.01) |

(52) U.S. Cl.
CPC .............. *B60R 19/36* (2013.01); *B60R 19/00* (2013.01); *B60R 19/20* (2013.01); *B60R 19/28* (2013.01); *B60R 19/30* (2013.01); *B60R 19/32* (2013.01); *B62D 21/15* (2013.01); *B60R 2019/005* (2013.01); *B60R 2019/262* (2013.01); *B60R 2021/0009* (2013.01); *B60T 7/22* (2013.01)

(58) Field of Classification Search
CPC ......... B60R 19/26; B60R 19/28; B60R 19/32; B60R 19/36; B60T 7/22
USPC ............... 293/8, 9, 107, 129, 132, 134–137; 296/187.03, 187.06, 187.09; 180/275
See application file for complete search history.

(56) References Cited

U.S. PATENT DOCUMENTS

| | | | | |
|---|---|---|---|---|
| 1,600,465 A | * | 9/1926 | Gentiloni | B60R 19/02 180/275 |
| 2,142,328 A | * | 1/1939 | Mutter | B60R 19/02 180/275 |
| 2,959,251 A | * | 11/1960 | Landman | B60R 19/02 180/276 |
| 3,659,835 A | * | 5/1972 | Peterson | F16F 9/303 188/371 |

(Continued)

*Primary Examiner* — Gregory A Blankenship

(57) ABSTRACT

Safe protection equipment for all vehicles will significantly reduce the collision force by spring or liquid cylinder when the vehicle bumps to obstacle or two vehicles collide with each other. This equipment can be used on both front and rear of the vehicle. Combination of springs or liquid cylinder with different elasticity can reduce the collision smoothly. This equipment will protect both vehicles and drivers without changing the current air-bag protection system. It will significantly reduce the damage for serious collision accidents.
This equipment is attached to the vehicle chassis on bottom, which will bear the collision force reduced by the spring or liquid cylinder. It might require some design change in vehicle chassis.
One option is to add a pad to pass the reduced collision force to the elastic tire when colliding vehicles are running in straight line.

10 Claims, 3 Drawing Sheets

(56) References Cited

U.S. PATENT DOCUMENTS

| | | | | |
|---|---|---|---|---|
| 5,593,195 | A * | 1/1997 | Lei | B60R 19/02 293/134 |
| 5,971,451 | A * | 10/1999 | Huang | B60R 19/18 293/102 |
| 6,050,624 | A * | 4/2000 | Kim | B60R 19/28 293/132 |
| 6,217,090 | B1 * | 4/2001 | Berzinji | B60R 19/28 293/106 |
| 6,302,458 | B1 * | 10/2001 | Wang | B60R 19/40 293/119 |
| 6,467,836 | B1 * | 10/2002 | Miller | B60R 19/00 188/374 |
| 6,626,474 | B1 * | 9/2003 | Ameur | B60R 19/40 293/107 |
| 8,544,589 | B1 * | 10/2013 | Rupp | B62D 21/152 180/274 |
| 8,544,905 | B2 * | 10/2013 | Handing | B60R 19/34 293/118 |
| 2005/0104391 | A1 * | 5/2005 | Browne | B60R 19/03 293/132 |
| 2008/0238115 | A1 * | 10/2008 | Chong | B60R 19/00 293/132 |
| 2008/0309101 | A1 * | 12/2008 | Matsubara | B60R 19/26 293/119 |
| 2010/0109356 | A1 * | 5/2010 | Shoap | B60R 19/26 293/132 |

* cited by examiner

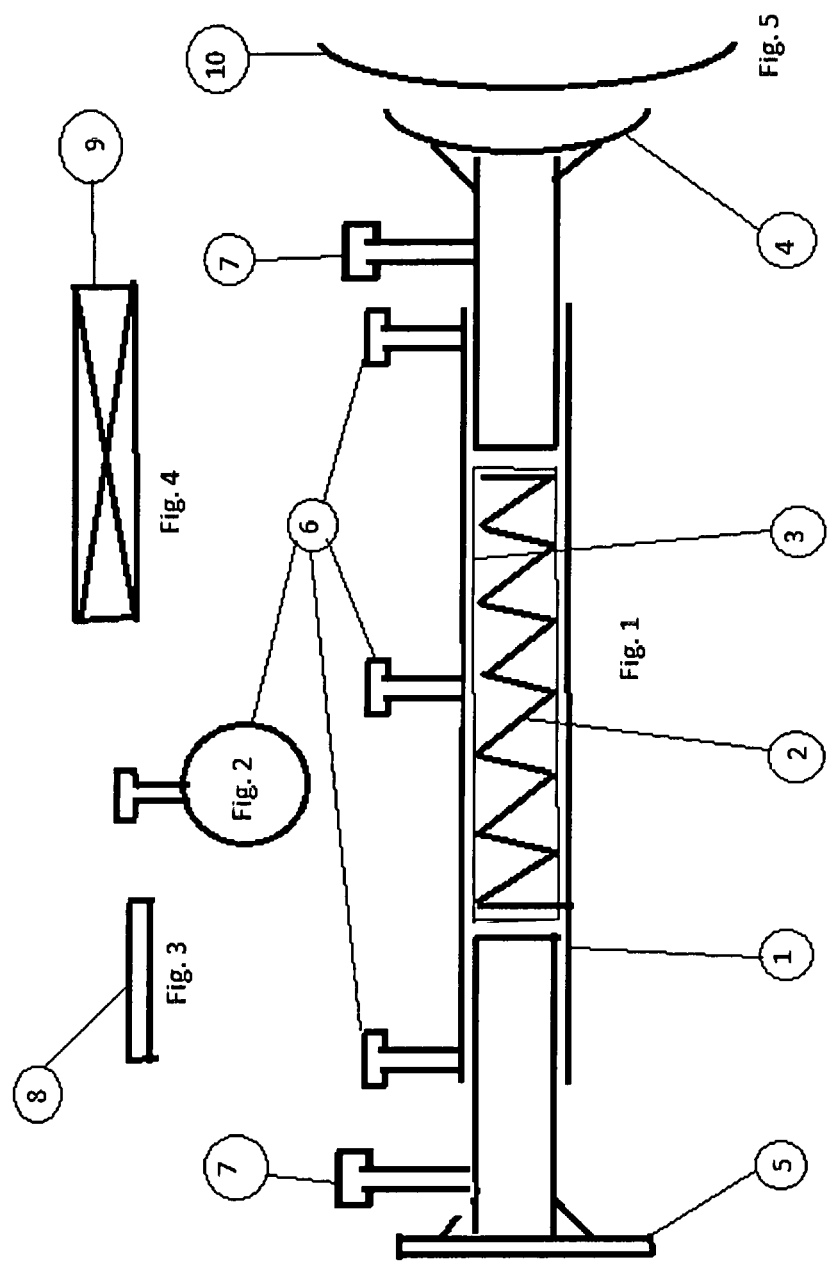

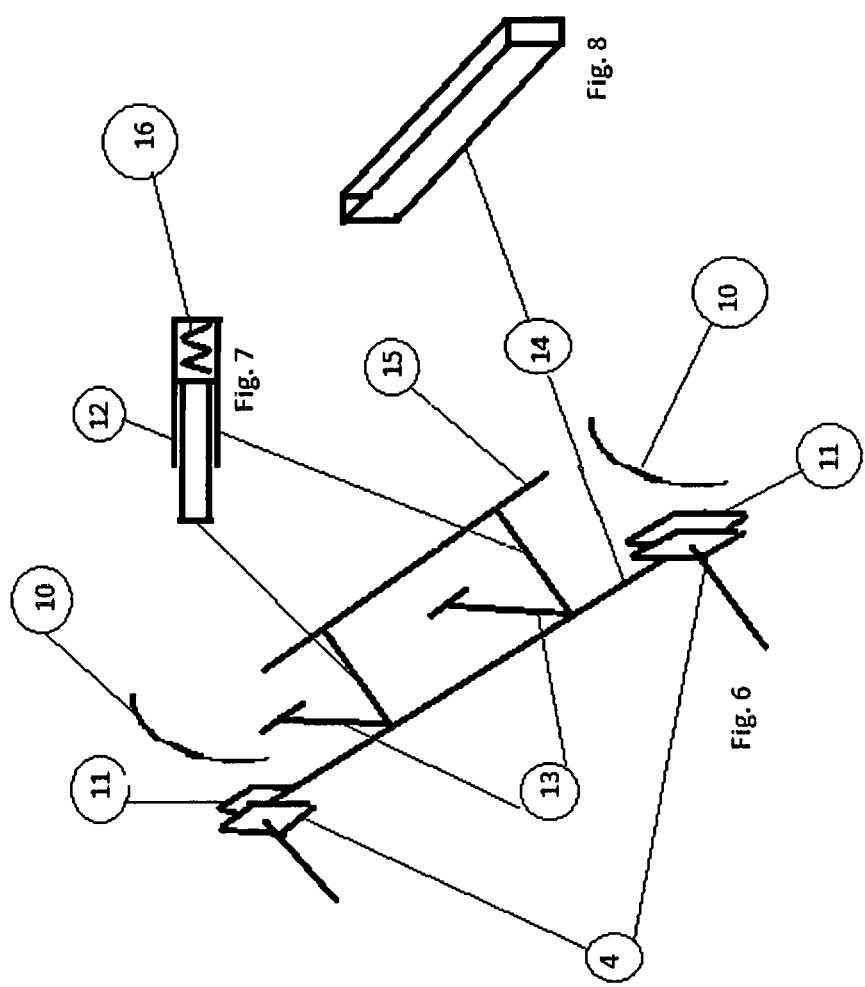

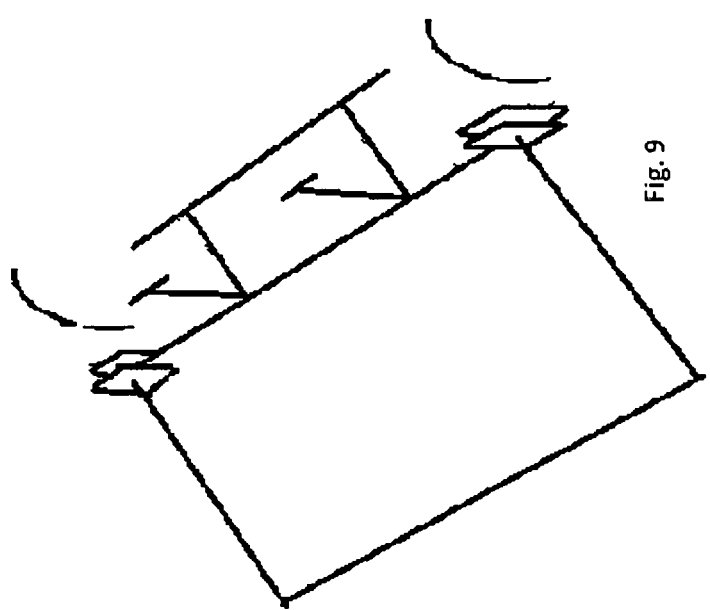

SAFE PROTECTION EQUIPMENT FOR ALL VEHICLES AND DRIVERS FROM BOTH FRONT AND REAR

TECHNICAL FIELD

The present invention generally relates to improvements in protecting both vehicles and drivers utilizing the elasticity of spring and/or liquid cylinder from either front and/or rear to over collision accidents. The spring or liquid cylinder will be compressed to reduce the colliding force when the vehicle hits an obstacle or collides with each other. The reduced colliding force will be passed to the chassis of the vehicle. An additional option is to use the tire elasticity to reduce the colliding force.

There is no change for the current airbag protection system.

BACKGROUND ART

Currently, most vehicles use airbag to protect the drivers in collision accidents. There is limitation with airbag protection. Airbag only protects driver, but not vehicle. When the vehicle hits an obstacle or collide with each other, the body and auto parts can be damaged. In case of heavy collision accident, not only the vehicles are seriously damaged, but also the drivers could be seriously injured or even killed due to the strong colliding force. Even in case the collision is not heavy, the vehicle body or auto parts are still damaged.

SUMMARY OF THE INVENTION

An object of the present invention is to utilize the elasticity of spring or liquid cylinder or tire to reduce the colliding force and pass the reduced colliding force to the chassis or tire to protect the vehicle and improve the protection over drivers. The current airbag protection system is not changed. Overall it will significantly reduce the damage for both vehicles and drivers in the collision accidents.

In accordance with the present invention, there is a tube with one or multiple springs or liquid cylinders inside. The tube is fixed to the chassis of the vehicle, one on left and another one on right symmetrically. On one end of the tube, a movable cylinder is put inside the tube. This cylinder is fixed to the front bump, which is changed as a movable part from the current fixed part. To make the front bump movable, one choice is to hang the cylinder fixed to the bump to the vehicle chassis with sliding rails. On another end of the tube, another movable cylinder is also put inside the tube. This movable cylinder is fixed to a bar that connects the pair of cylinders. The bar has an optional pad on each end. The pad is near the tire. The movable cylinder is hung to the sliding rails attached to the chassis. The bar is hung to the sliding rails. The bar has a pair of cylinders that are put inside the secondary tube with spring. The secondary tube is fixed to the chassis.

In accordance with the present invention, when the vehicle hits an obstacle or collide with another vehicle, the cylinder fixed to the bump will push the spring or liquid cylinder, which will push another movable cylinder with the pad to the tire, if the vehicle is running almost in straight line. During this process, the spring or liquid cylinder will reduce the colliding force by compression. The elasticity of the tire also can reduce the colliding force. If the vehicle is turning left or right with big angle, the pad will not hit the tire, so the movable cylinder with the bar will move further to push the spring in the secondary tube. The spring in the secondary tube is compressed to reduce the colliding force. The reduced colliding force will be passed to the chassis. If the collision is not heavy, there should be no any damage to both vehicle and driver. If the collision is heavy, it might cause the vehicle turning back. It might trigger the vehicle to pop up the airbag. In any case, it will significantly reduce the damage to the vehicle and driver.

In accordance with the present invention, this equipment can be installed on both front and rear of the vehicle with similar design architecture. The vehicle might need to change the chassis and frame design to attach the equipment properly.

In accordance with the present invention, either the primary tube or secondary tube can contain single or multiple springs or liquid cylinders with different elasticity, or combination of springs and liquid cylinders. The combination of springs or liquid cylinders with different elasticity will reduce the colliding force smoothly with the spring or liquid cylinders of soft elasticity being compressed first.

BRIEF DESCRIPTION OF THE DRAWINGS

FIG. 1 provides the primary horizontal view from the left side of the vehicle. There are no other views since the equipment is simply composed of tubes or bars while the size needs further experiment based on the size and type of vehicle.

FIG. 2 provides the cross section view of the component 6 that fixes the tube to the chassis.

FIG. 3 provides side view of the component 8, sliding rails hanging to the vehicle.

FIG. 4 provides front view of component 9, steel plate or bars that connect 2 spring equipment together near the tire.

FIG. 5 provides side view of the tire, component 10.

FIG. 6 provides the 3D architecture view of the equipment (portion). This portion needs to combine with FIG. 1 for the complete equipment.

FIG. 7 provides horizontal side view of the tube with spring inside it. The tubes are fixed to the chassis.

FIG. 8 provides 3D view of the bar that connects 2 primary tubes together.

FIG. 9 supplements the complete 3D architecture view of the equipment. It omits the parts attaching to front bumper or chassis.

Note: Unless specified, most parts are tubes or bars. No other views are needed for design. The size needs further experiment based on the type and size of vehicles.

DETAILED DESCRIPTION OF PREFERRED EMBODIMENTS

This equipment can be applied to all type of vehicles, e.g., cars, vans and trucks. The material can be steel or composites. The size of equipment or the elasticity of the spring (2) or liquid cylinder (3) needs further experiment based on the vehicle. A pair of tubes (1) is installed to the chassis in left and right of the vehicle symmetrically. The bump (5) can be designed in different ways such as plate or combination of tube. In case of combination of springs (2) or liquid cylinders (3), the spring (2) or liquid cylinder (3) with soft elasticity should be compressed first. The chassis and frame of the vehicle need some strength enhancement. The brake pad (4) is optional. If there is brake pad (4), the primary tube (1) should be installed in left or right in the position of middle of the tire (10) when the vehicle is running in straight line. If there is no brake pad (4), the bar (9) is shorter and the primary tube (1) is installed in the position after the internal side of the tire (10) when the vehicle is running in straight line.

When the vehicle hit an obstacle or two vehicles collide with each other, the bump (5) will push the spring (2) or liquid cylinder (3) through the movable cylinder fixed to the bump (5). The spring (2) or the liquid cylinder (3) will push the cylinder fixed to the bar (9). If the vehicle is running in straight line or almost straight line, the brake pad (4) will hit the tire (10). During this process, the spring (2) or liquid cylinder (3) inside the tube (1) will be compressed to reduce the colliding force. The elasticity of the tire (10) will also reduce the colliding force. If the vehicle is turning left or right with big angle, the brake pad (4) will not hit the tire (10) and the cylinder fixed to the bar (9) will move forward to push the spring (16) in secondary tube (12). The spring (16) in secondary tube will be compressed to reduce the colliding force. The secondary tube (12) will pass the reduced force to the chassis. If the colliding is very heavy, it will also trigger the vehicle to pop up the airbag. In any case, the damage of the vehicle and the driver from the collision accidents will be reduced significantly.

The invention claimed is:

1. A primary tube with spring or liquid cylinder comprising:
    a tube (1)
    a part (6) fixing the tube to a chassis
    single or multiple springs (2) or liquid cylinders (3) or combination of springs (2) and liquid cylinders (3)
    2 movable cylinders inside the tube with one in one end and another cylinder in other end of the tube being able to move forth and back, one fixed to a bumper and another cylinder fixed to a bar (9), both are hung to sliding rails characterized in that a colliding force hitting on the bumper moves the cylinder fixed to the bumper forward and push the spring (2) or liquid cylinder (3) that push another cylinder fixed to the bar (9) moving towards a tire (10) until a brake pad (11) hits the tire (10) thereof the spring (2) or liquid cylinder (3) in the primary tube (1) will be compressed to reduce the colliding force that is passed to the tire (10) hence significantly reduce a damage to a body of a vehicle and passengers inside the vehicle in that the colliding force hitting on the bumper is passed to the body of the vehicle without reduction in an airbag protection system.

2. The primary tube as claimed in claim 1 characterized in that the combination of springs (2) or liquid cylinders (3) has different values of elastic coefficient, with one having a low value of elastic coefficient, to reduce the colliding force smoothly with the spring or liquid cylinder of low value of elastic coefficient being compressed first.

3. The primary tube as claimed in claim 1 characterized in that the tire (10) having elasticity will reduce the colliding force if the brake pad (4) hits the tire (10) when the vehicle is running in straight line or almost straight line.

4. The primary tube as claimed in claim 1 characterized in that the tube can be applied to one of a car, van, and truck.

5. The primary tube as claimed in claim 1 characterized in that the tube can be applied to a front and/or rear of the vehicle.

6. A secondary tube with spring or liquid cylinder comprising:
    a tube (12) fixed to a chassis
    a movable cylinder fixed to a bar (14) in one end and inside the tube (12) in another end
    single or multiple springs (16)
    characterized in that the bar (14) moves the movable cylinder inside the secondary tube (12) and push the spring (16) being compressed to reduce a colliding force that is passed to the chassis when a vehicle is turn left or right with big angle and a brake pad (11) will not hit a tire hence significantly reduce the damage to a body of the vehicle and passengers inside the vehicle in that the colliding force hitting on a bumper is passed to the body of the vehicle without reduction in an airbag protection system.

7. The secondary tube as claimed in claim 6 characterized in that the secondary tube (12) passes the reduced colliding force to the chassis of the vehicle.

8. The secondary tube as claimed in claim 6 characterized in that the combination of springs (16) has different values of elastic coefficient, with one having a low value of elastic coefficient, to reduce the colliding force smoothly with the spring of low value of elastic coefficient being compressed first.

9. The secondary tube as claimed in claim 6 characterized in that the tube (12) can be applied to one of a car, van, and truck.

10. The secondary tube as claimed in claim 6 characterized in that the tube can be applied to a front and/or rear of the vehicle.

* * * * *